US008825863B2

(12) United States Patent
Hansson et al.

(10) Patent No.: US 8,825,863 B2
(45) Date of Patent: Sep. 2, 2014

(54) VIRTUAL MACHINE PLACEMENT WITHIN A SERVER FARM

(75) Inventors: Nils Peter Joachim Hansson, Monroe, WA (US); Edward S. Suffern, Chapel Hill, NC (US); James L. Wooldridge, Fall City, WA (US); Brian You, Mercer Island, WA (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/236,731

(22) Filed: Sep. 20, 2011

(65) Prior Publication Data

US 2013/0073730 A1 Mar. 21, 2013

(51) Int. Cl.
*G06F 15/173* (2006.01)

(52) U.S. Cl.
USPC ............................ 709/226; 709/223; 709/224

(58) Field of Classification Search
USPC ......................................... 709/226, 223–224
See application file for complete search history.

(56) References Cited

U.S. PATENT DOCUMENTS

| | | | |
|---|---|---|---|
| 7,934,035 B2 | 4/2011 | Miloushev et al. | |
| 8,341,626 B1 * | 12/2012 | Gardner et al. | 718/1 |
| 2002/0112132 A1 * | 8/2002 | Lesmanne et al. | 711/141 |
| 2003/0120724 A1 * | 6/2003 | Kawashimo et al. | 709/203 |
| 2003/0131067 A1 * | 7/2003 | Downer et al. | 709/213 |
| 2005/0044301 A1 * | 2/2005 | Vasilevsky et al. | 711/1 |
| 2005/0120160 A1 * | 6/2005 | Plouffe et al. | 711/1 |
| 2005/0169309 A1 * | 8/2005 | Tripathi et al. | 370/469 |
| 2006/0064518 A1 * | 3/2006 | Bohrer et al. | 710/22 |
| 2007/0226449 A1 | 9/2007 | Akimoto | |
| 2009/0077550 A1 | 3/2009 | Rhine | |
| 2009/0307689 A1 * | 12/2009 | Sudhakar | 718/1 |
| 2009/0313445 A1 * | 12/2009 | Pandey et al. | 711/162 |
| 2010/0011447 A1 * | 1/2010 | Jothimani | 726/27 |
| 2010/0017802 A1 * | 1/2010 | Lojewski | 718/1 |
| 2010/0242045 A1 * | 9/2010 | Swamy et al. | 718/104 |
| 2010/0306382 A1 * | 12/2010 | Cardosa et al. | 709/226 |
| 2010/0333089 A1 * | 12/2010 | Talwar et al. | 718/1 |
| 2011/0004733 A1 * | 1/2011 | Krakirian et al. | 711/147 |
| 2011/0029672 A1 * | 2/2011 | Agneeswaran | 709/226 |

(Continued)

FOREIGN PATENT DOCUMENTS

| | | |
|---|---|---|
| CN | 101593133 A | 12/2009 |
| CN | 102185928 A | 9/2011 |
| WO | WO2011059604 A2 | 5/2011 |

OTHER PUBLICATIONS

Rao, DS.-et al.; "vNUMA-mgr: managing VM memory on NUMA platforms";Intern'l Conference on High Performance Computing(HiPC'2010); 10pp.; IEEE; 2010.

(Continued)

*Primary Examiner* — Waseem Ashraf
(74) *Attorney, Agent, or Firm* — Olive Law Group, PLLC; Thomas E. Tyson

(57) ABSTRACT

Disclosed herein are methods, systems, and computer program products for the placement of a virtual machine within a plurality of cache-coherent NUMA servers. According to an aspect, an example method includes determining a resource requirement of the virtual machine. The example method may also include determining a resource availability of one or more nodes of the plurality of servers. Further, the example method may include selecting placement of the virtual machine within one or more nodes of the plurality of cache-coherent NUMA servers based on the determined resource requirement and the determined resource availability.

19 Claims, 11 Drawing Sheets

(56) References Cited

U.S. PATENT DOCUMENTS

| | | | |
|---|---|---|---|
| 2011/0078467 A1* | 3/2011 | Hildebrand | 713/310 |
| 2011/0078700 A1* | 3/2011 | Blackburn et al. | 718/105 |
| 2011/0082892 A1 | 4/2011 | Ogasawara | |
| 2011/0191461 A1* | 8/2011 | Dasgupta et al. | 709/224 |
| 2011/0202640 A1* | 8/2011 | Pillutla | 709/221 |
| 2011/0225277 A1* | 9/2011 | Freimuth et al. | 709/223 |
| 2011/0239215 A1* | 9/2011 | Sugai | 718/1 |
| 2011/0282986 A1* | 11/2011 | Phaal | 709/224 |
| 2011/0295999 A1* | 12/2011 | Ferris et al. | 709/224 |
| 2012/0167083 A1* | 6/2012 | Suit | 718/1 |
| 2012/0204051 A1* | 8/2012 | Murakami et al. | 713/324 |
| 2012/0266166 A1* | 10/2012 | Farkas et al. | 718/1 |

OTHER PUBLICATIONS

Williams, DE.-et al.; "Virtualization with Xen"; Syngrass Publishing Inc.; Elsevier Inc.; www.syngrass.com; pp. 1-357; 2007.

International Search Report dated Oct. 25, 2012 for related application PCT/CN2012/078781 filed Jul. 18, 2012; reference included herein.

\* cited by examiner

VIRTUAL MACHINE PLACEMENT WITHIN A SERVER FARM

BACKGROUND

1. Field of the Invention

The present invention relates to the placement of a virtual machine, and more specifically, methods and systems for the placement of a virtual machine within a plurality of servers.

2. Description of Related Art

In multi-processor servers, processors and memory are commonly configured into nodes that are tied together by a cache coherent interconnect. While these multi-processor systems may conform to Symmetrical Multi-Processor programming models, they are commonly not symmetric with respect to memory access times from different processors. This class of multi-processor server is commonly known as cache coherent non-uniform memory access (cc-NUMA) servers. The non-uniformity in this class of servers describes the memory access time difference between memory accessed by a processor close to the memory controller versus memory accessed by a processor on a different node. When processors reference memory off-node, the software pays a performance penalty for this off-node memory reference. It is beneficial, therefore, for the operating system, or the hypervisor, to schedule processes, or virtual machines, within a cc-NUMA node such that the software can experience "uniform, and optimal, memory access time" within a non-uniform memory system.

The difficulties associated with scheduling virtual machines within a common node are understood, and a variety of solutions have been implemented within the computing industry. These classes of solutions are generally referred to as cc-NUMA-based scheduling and memory allocation algorithms. However, the applicability and usefulness of these approaches are limited to the physical resources available on one server—in other words, these algorithms only understand, and optimize within, a single cc-NUMA-based server. This approach may result in memory fragmentation if a virtual machine is placed on a server where the virtual machine's memory cannot be allocated wholly to a single node, resulting in the memory being split across multiple cc-NUMA nodes. The virtual machine may experience memory access time degradation whenever the processor accesses the virtual machine's memory in other nodes. Accordingly, there is a need for improved methods and systems for optimizing placement of virtual machines.

BRIEF SUMMARY

In accordance with one or more embodiments of the present invention, methods and systems disclosed herein provide for the placement of a virtual machine within a plurality of servers. An example method includes determining a resource requirement of the virtual machine, determining a resource availability of one or more nodes of the plurality of servers, and selecting placement of the virtual machine within one or more nodes of the plurality of servers based on the determined resource requirement and the determined resource availability. The resource availability may be determined by the amount of physical memory available within one or more nodes of the plurality of servers, and the placement of the virtual machine may be based on the amount of physical memory available within those nodes. The virtual machine may be placed within one or more nodes of one physical server among the plurality of servers or within one node of one physical server among the plurality of servers.

In accordance with embodiments of the present invention, the resource availability may also be based on a uniform memory access availability. The one or more nodes of the plurality of servers may include a processor and a memory. The plurality of servers may be non-uniform memory access servers configured to utilize a cache coherent interconnect and to operate in a server farm. The method may also include selecting a virtual machine for migration, generating a list of candidate servers from the plurality of servers, and then migrating the virtual machine from a first server of the plurality of servers to a second server among the list of candidate servers based on the determined resource requirement and the determined resource availability.

DETAILED DESCRIPTION

Figure 1:
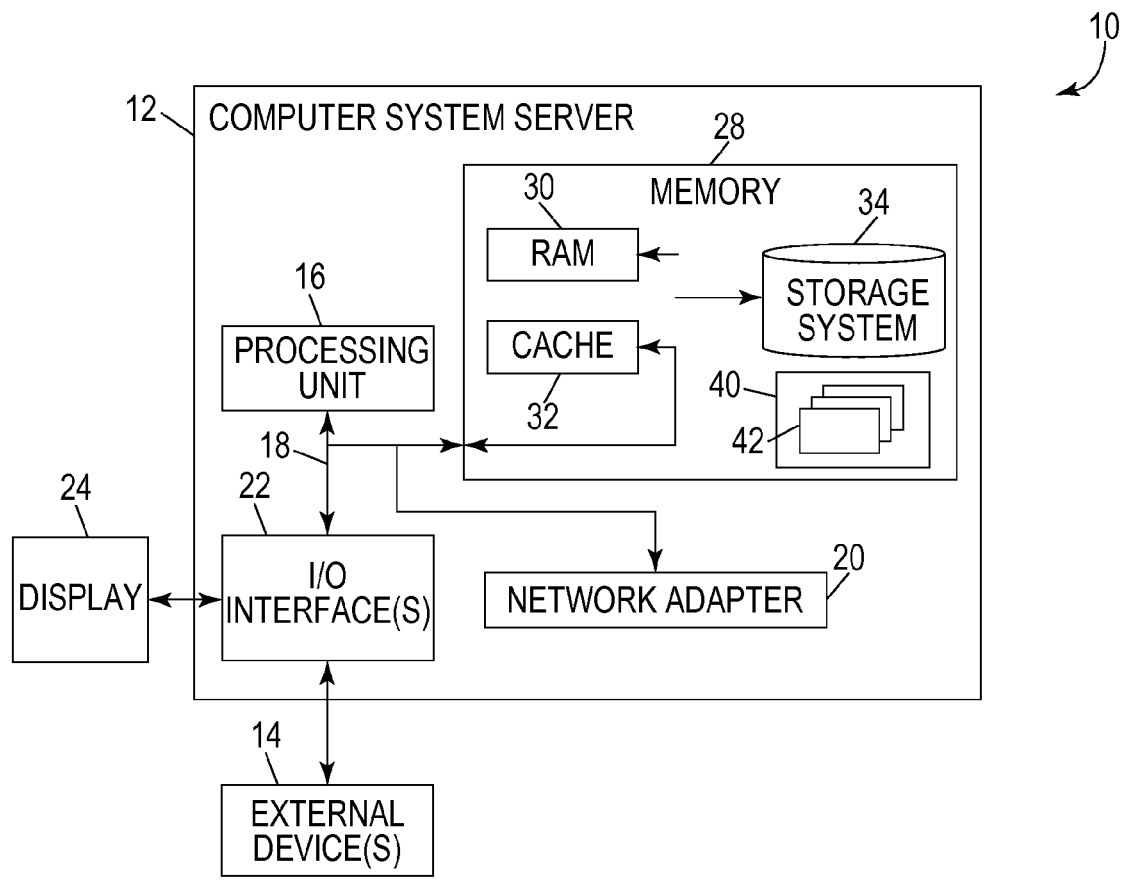
FIG. 1 illustrates an example cloud computing node.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

This disclosure includes a detailed description on cloud computing; however, it is understood that the implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected computing nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, and removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one computer program product having a set (e.g., at least one) of program modules that may be configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally may carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
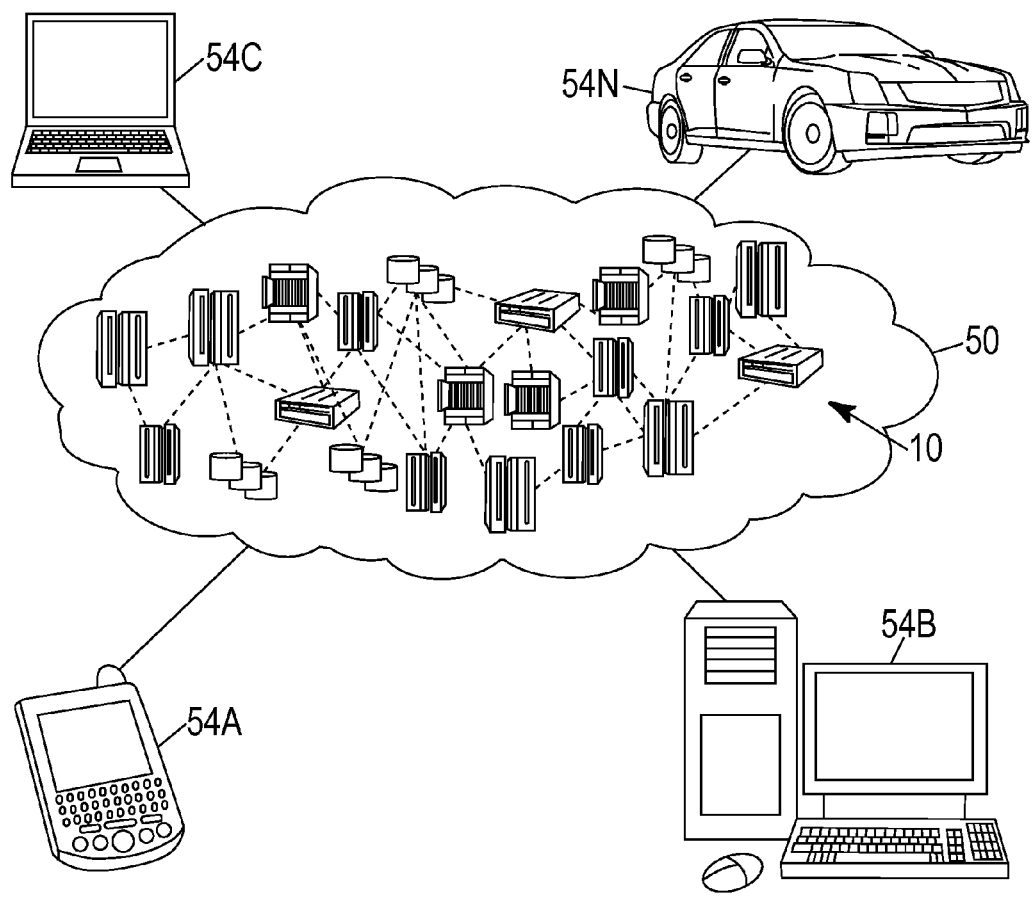
FIG. 2 illustrates an example cloud computing environment.

Referring now to FIG. 2, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
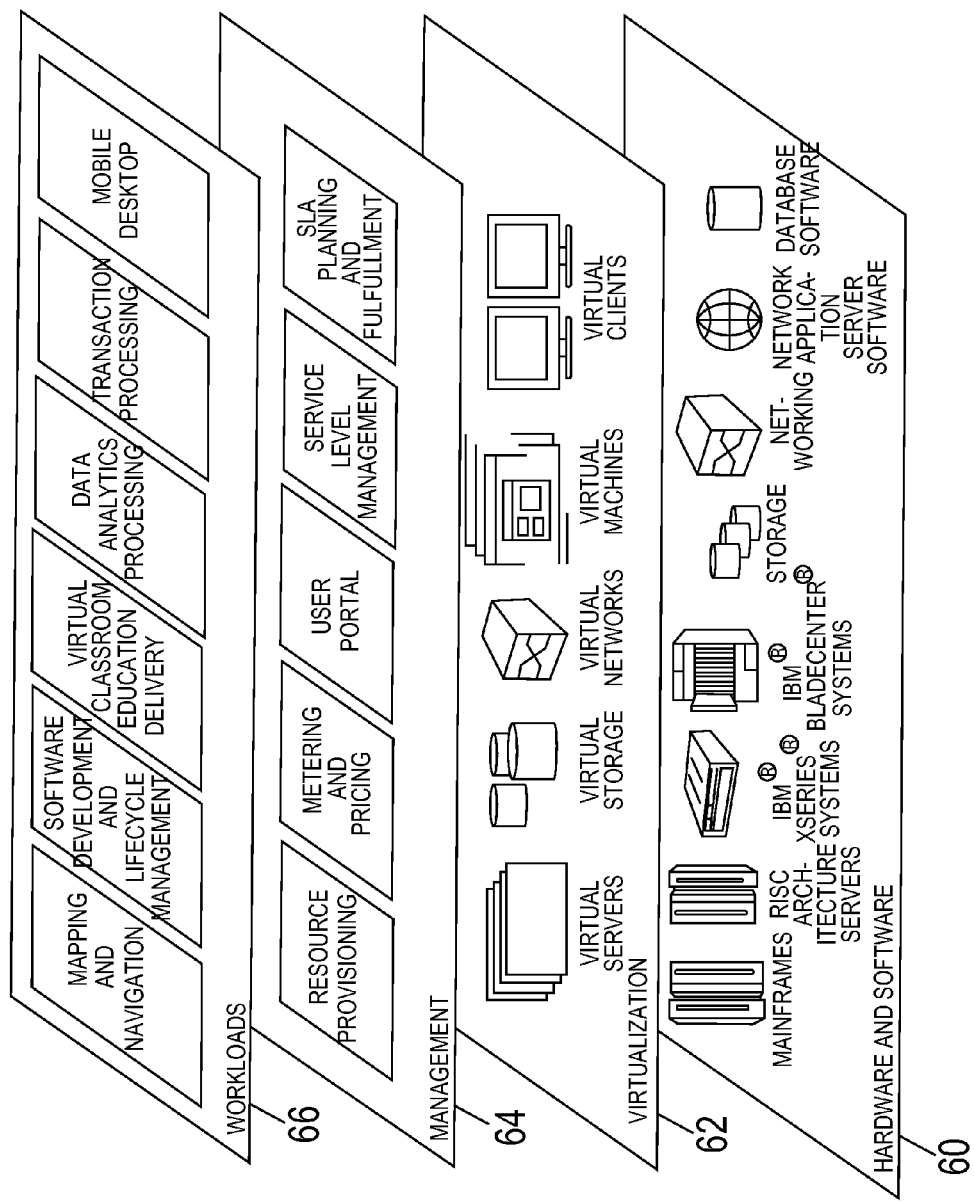
FIG. 3 illustrates example abstraction model layers.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual machines, including virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
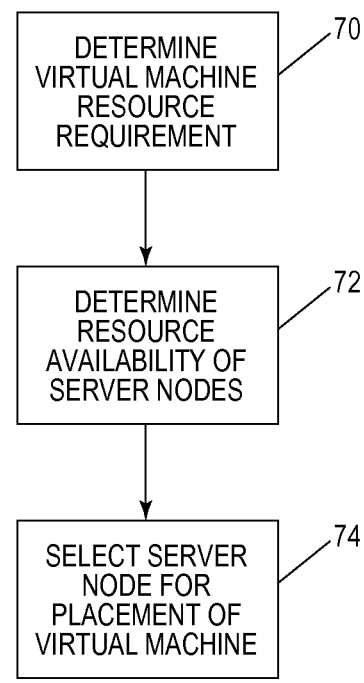
FIG. 4 illustrates a flowchart diagram of a method for placing a virtual machine within a plurality of servers according to embodiments of the present invention.

FIG. 4 illustrates a flowchart of a method for placement of a virtual machine within a plurality of servers in accordance with embodiments of the present invention. Referring to FIG. 4, the method includes determining 70 a resource requirement of the virtual machine. The resource requirement may be a memory requirement in the form of an allocation of memory that may be necessary for the virtual machine to function at an optimal performance level. The method may also include determining 72 a resource availability of one or more nodes of the plurality of servers. The resource availability may be a memory availability that may include the amount of physical memory available within each node of a server or a uniform memory access availability. The availability of other resources may also be determined, such as whether a particular server has sufficient processor, memory, or I/O bandwidth.

Finally, the method may include selecting 74 placement of the virtual machine within one or more nodes of the plurality of servers based on the determined resource requirement and the determined resource availability. After examining the resource requirement for the virtual machine and the availability of resources from multiple nodes within the plurality of servers, a selection may be made regarding where the virtual machine is to be placed to optimize the performance of the virtual machine and the use of available server resources. The virtual machine placement may be based on the amount of physical memory available within at least one of the one or more nodes of the plurality of servers, such as, for example, when the placement is based on the amount of physical memory available within one node of one physical server in order to provide the virtual machine with node-local (uniform) memory access. The plurality of servers may comprise a plurality of non-uniform memory access servers, and those servers may be configured to utilize a cache coherent interconnect or to operate in a server farm.

Figure 5:
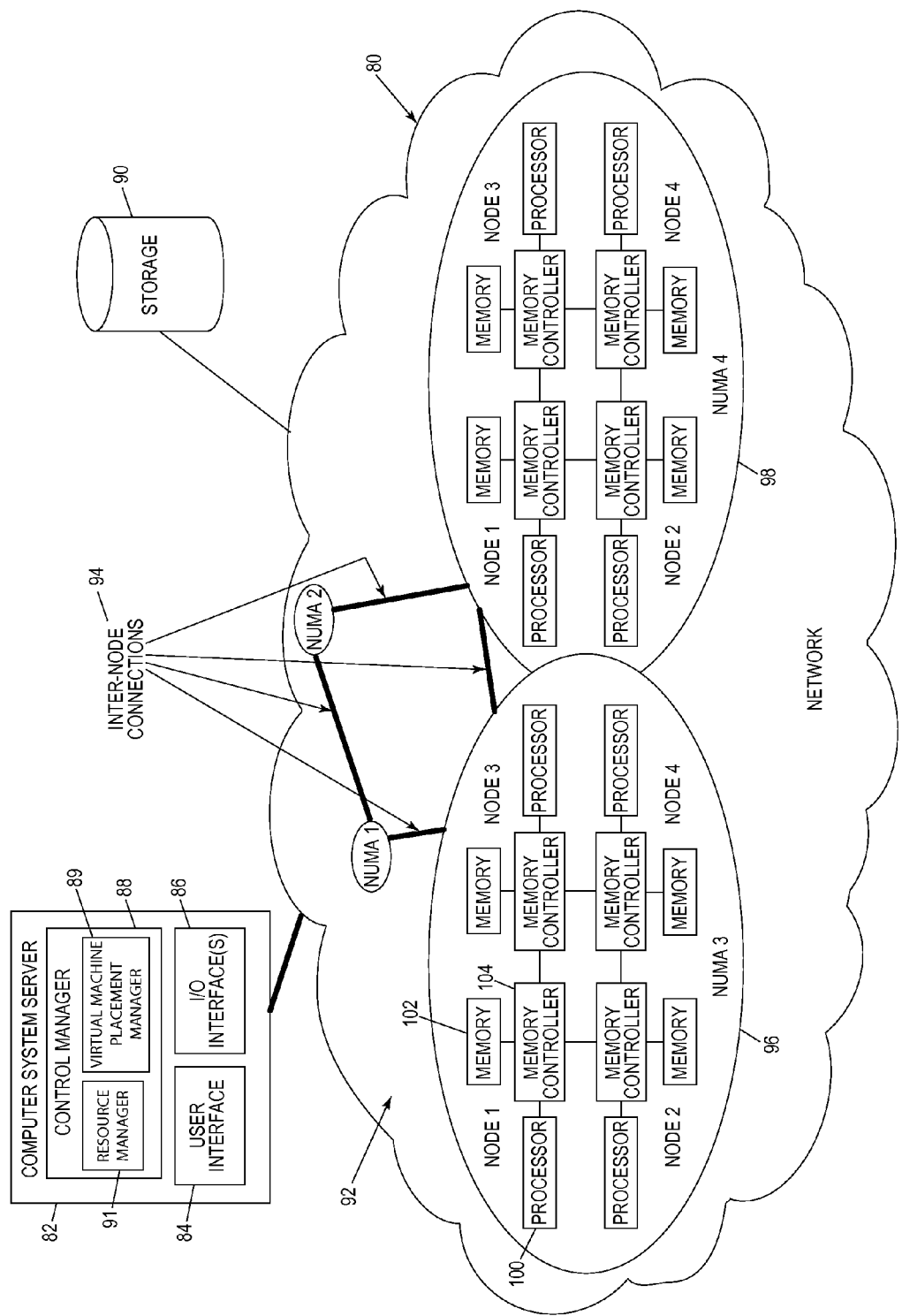
FIG. 5 illustrates cc-NUMA-based servers configured to operate in a server farm according to embodiments of the present invention.

FIG. 5 illustrates cc-NUMA-based servers configured to operate in a server farm according to embodiments of the present invention. With reference now to FIG. 5, multiple cc-NUMA-based servers are configured to operate in a server farm according to embodiments of the present invention. For the purpose of illustration, a network 80 is shown that includes four cc-NUMA based servers 92 that may communicate via inter-node connections 94. The non-uniformity in this class of servers describes the memory access time difference between memory accessed by a processor close to a memory controller versus memory accessed by a processor that is further away. While only four cc-NUMA-based servers 92 are shown, the network 80 may include any number of additional cc-NUMA-based servers configured to operate as a server farm in accordance with an embodiment of the present invention. The network 80 may be a computing node 10 in a cloud computing environment 50 (FIG. 2) as described previously. Storage 90 is available for use by the various devices and components of the network 80.

A computer system server 82 is configured to manage the provisioning of available server resources. The computer system server 82 may include a computer system/server 12 (FIG. 1) as was described previously. The computer system server 82 may include a user interface 84 such as a keyboard, a pointing device, a display, or other similar device that enable a user to interact with the computer system server 82. I/O interfaces(s) 86 that enable computer system server 82 to communicate with other devices in network 80 or in a cloud computing environment 50 (FIG. 2) may also be included. In an embodiment of the present invention, a control manager 88 manages the resources of the cc-NUMA-based server farm. The control manager 88 may be implemented in either hardware or software. The control manager 88 may include a virtual machine placement manager 89 configured to execute and respond to placement requests and a resource manager 91 configured to determine a resource requirement of the virtual machine, determine a resource availability of one or more nodes of the plurality of servers, and select placement of the virtual machine within one or more nodes of the plurality of servers based on the determined resource requirement and the determined resource availability. The control manager 88 may include management software running on the computer system server 82 that significantly improves the selection criteria of servers within a server farm to increase the performance of individual virtual machines and to increase overall resource utilization.

The cc-NUMA-based servers 92 include a NUMA 3 server 96 and a NUMA 4 server 98. As shown, the cc-NUMA servers 92 may include a processor 100, a memory 102, and a memory controller 104 organized and configured into one or more server nodes tied together by a cache coherent interconnect. The server nodes may have multiple processors (CPUs) and the size and speed of the associated memory may vary from node to node and from server to server. For the purpose of illustration, the NUMA 3 server 96 and the NUMA 4 server 98 each have four server nodes, but each server may be configured to have any number of server nodes. The processor 100 may access memory 102, as well as memory in other nodes of the NUMA 3 server 96, the NUMA 4 server 98, and other servers. However, the memory access times may vary from node to node; therefore, when placing a virtual machine within a cc-NUMA-based server, it is best to place the virtual machine where the memory required for optimal performance is allocated within one node of one physical server.

Figure 6:
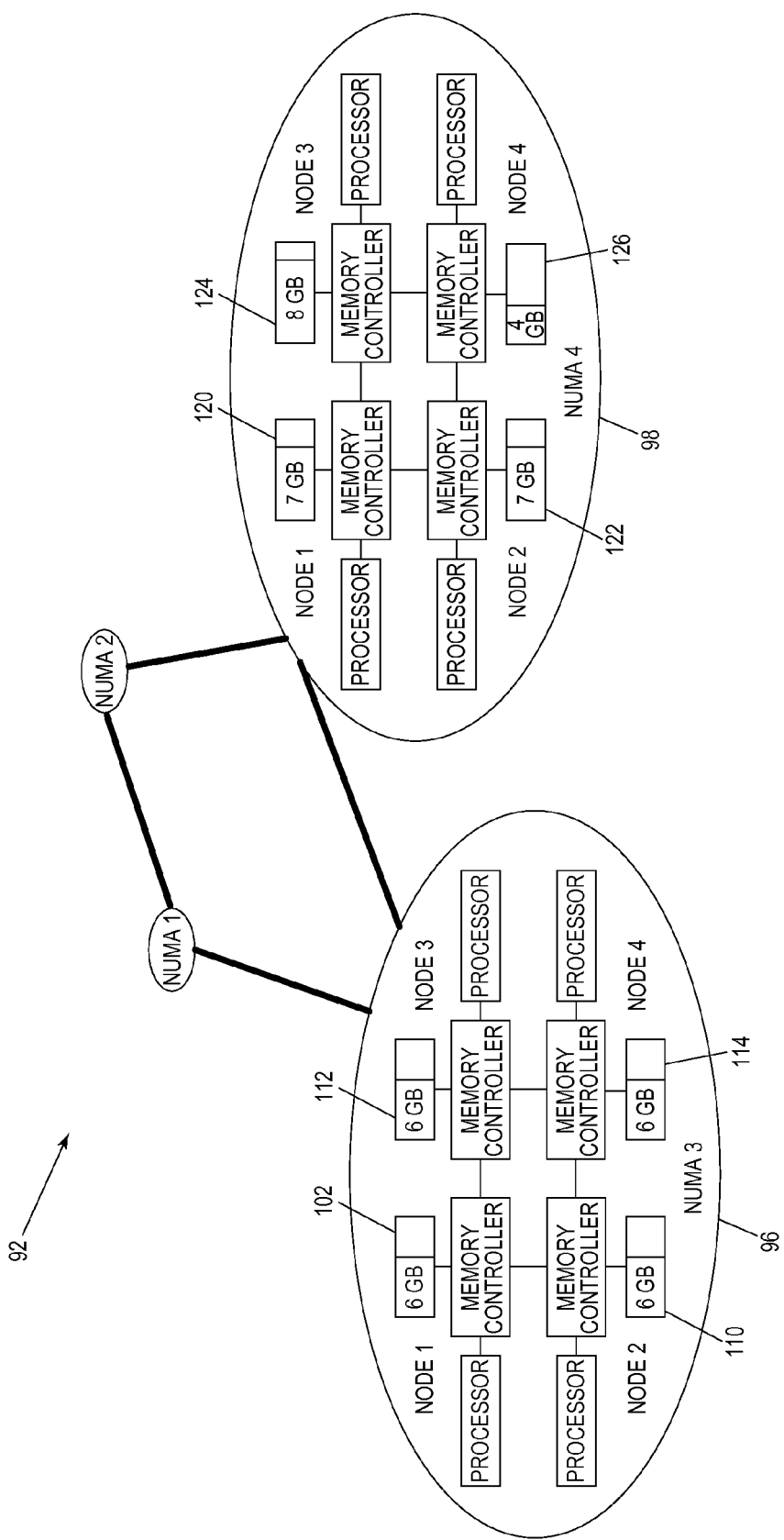
FIG. 6 illustrates a memory allocation for multiple cc-NUMA nodes according to embodiments of the present invention.

FIG. 6 illustrates a memory allocation for multiple cc-NUMA nodes according to embodiments of the present invention by the computer system server 82 shown in FIG. 5. Referring to FIG. 6, each of the cc-NUMA-based servers 92 in this embodiment has 40 GB of total memory—10 GB of memory on each node within the server. The servers may have any amount of memory that may be configured in a variety of ways between the server nodes and other devices. In this example, the memory in each node of the cc-NUMA-based servers 92 has been allocated to various virtual machines. As illustrated, four virtual machines are concurrently running on the NUMA 3 server 96 and four on the NUMA 4 server 98. The four virtual machines running on the NUMA 3 server 96 each have a 6 GB memory allocation on memory 102, 110, 112, and 114. This represents a balanced and optimized workload where all of the virtual machines can enjoy the performance benefits of node-local (uniform) memory access. The four virtual machines running on the NUMA 4 server 98 have different memory requirements that are reflected in the allocation of 7 GB on memory 120, 7 GB on memory 122, 8 GB on memory 124, and 4 GB on memory 126.

On the surface, since the virtual machine only needs 6 GB of memory, placing the virtual machine on the NUMA 3 server 96 would appear to be the best choice since the server has 16 GB of memory available compared to the 14 GB of memory available on the NUMA 4 server 98. However, a 6 GB memory allocation for the virtual machine on the NUMA 3 server 96 may require the memory allocation being split across multiple nodes since none of the nodes in the NUMA 3 server 96 have 6 GB available. This can result in memory degradation when the virtual machine's processor accesses the memory allocated in another node. The computer system server 82 shown in FIG. 5 has previously stored the memory allocations of both the NUMA3 and NUMA4 nodes. It can determine the best allocation of memory for the placement of new virtual machines based on their memory usage. Therefore, in accordance with embodiments of the present invention, the method described herein can place the virtual machine on the NUMA 4 server 98 instead of on the NUMA 3 server 96 since the NUMA 4 server 98 has 6 GB of memory available in memory 126 resulting in better performance of the virtual machine and better use of the resources available with the server farm.

Embodiments of the present invention may be utilized during the initial placement of a virtual machine or dynamically across a server farm by leveraging the dynamic migration of virtual machines from one server to another by moving a running workload from one physical server to another for the purpose of improving the performance of a virtual machine or increasing server utilization. Using the method and system embodiments described herein for initial virtual machine placement can improve the probability of allocating node-local memory to a deployed virtual machine, which improves the performance of the virtual machine. Using the method for dynamic resource management involves locating sub-optimal memory allocations that impact performance and then dynamically relocating a virtual machine to a server with available node-local memory in order to improve performance. When migrating virtual machines, the method may include selecting the virtual machine for migration and then migrating the virtual machine from a first server of the plurality of servers to a second server of the plurality of servers. Method and system embodiments described herein may also include generating a list of candidate servers of the plurality of servers for placement of the virtual machine and then migrating the virtual machine from a first server of the plurality of servers to a second server among the list of candidate servers based on the determined resource requirement and the determined resource availability.

Figure 7:
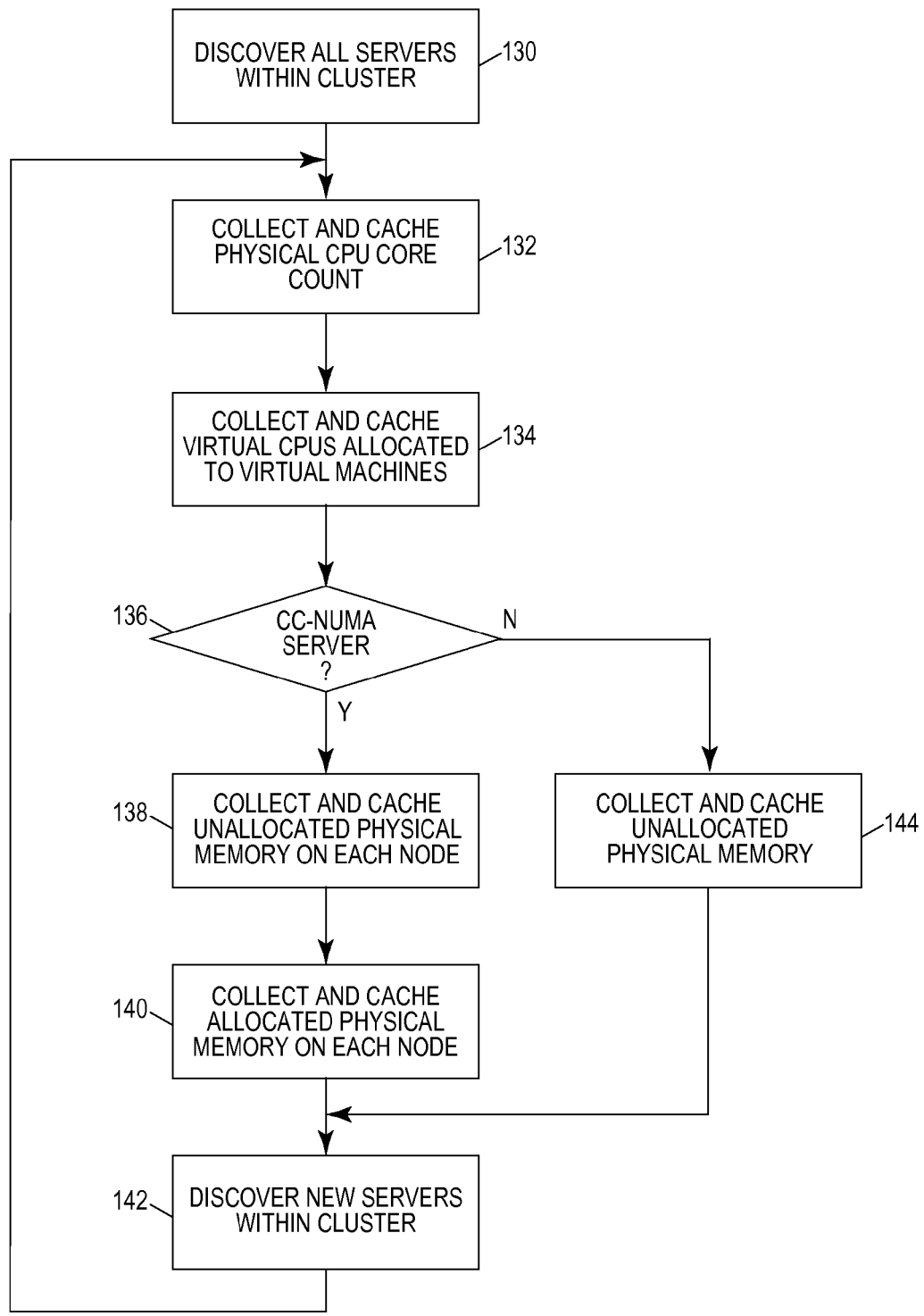
FIG. 7 illustrates a flowchart diagram of a method for collecting data for a plurality of servers according to embodiments of the present invention.

FIG. 7 illustrates a flowchart of a method for collecting data for a plurality of servers in accordance with embodiments of the present invention. Referring to FIG. 7, the method may include discovering 130 all of the servers within a cluster, and then for each server within the cluster, collecting and caching the physical CPU utilization for each processor core by collecting and caching 132 the physical CPU core count and collecting and caching 134 the virtual CPUs allocated to virtual machines. The method may then include determining 136 whether the server is a cc-NUMA server. In response to determining that the server is not a cc-NUMA server, the method may include collecting and caching 144 the unallocated physical memory and then discovering 142 any new servers within the cluster. If the server is a cc-NUMA server, the method may include collecting and caching 138 the unallocated physical memory on each node, collecting and caching 140 the allocated physical memory on each node, and then discovering 142 any new servers within the cluster.

Figure 8:
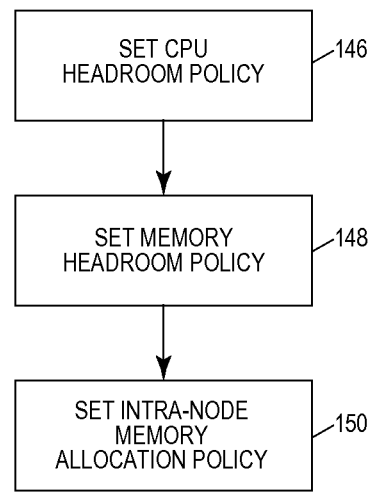
FIG. 8 illustrates a flowchart diagram of a method for setting a virtual machine allocation policy according to embodiments of the present invention.

FIG. 8 illustrates a flowchart of a method for setting a virtual machine allocation policy in accordance with embodiments of the present invention. A virtual machine allocation policy may be set by an administrator prior to deploying any virtual machines to help determine how aggressive the dynamic placement of virtual machines should be. Referring to FIG. 8, the method may include setting 146 the CPU headroom policy for servers within a server farm. The CPU headroom policy may be set as a percentage between about 0 and 99%. The method may also include setting 148 the overall memory headroom policy for servers within a server farm. The memory headroom policy may be set as a percentage somewhere between 0 and 99%. The method may also include setting 150 the intra-node memory allocation policy for virtual machines within a server farm. The intra-node memory allocation policy may be set as a percentage between about 0 and 100%.

Figure 9:
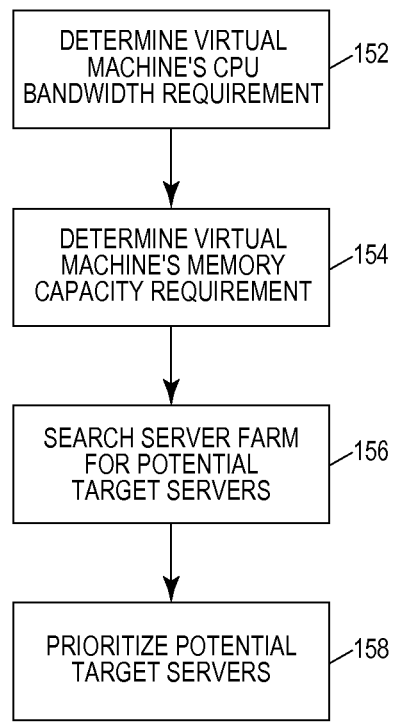
FIG. 9 illustrates a flowchart diagram of a method for placing a virtual machine within a plurality of servers according to embodiments of the present invention.

FIG. 9 illustrates a flowchart of a method for placement of a virtual machine within a plurality of servers in accordance with embodiments of the present invention. The method may be initiated by an administrative or programmatic deployment of a virtual machine. Referring to FIG. 9, the method may include determining 152 the virtual machine's CPU bandwidth requirement. The virtual machine's CPU bandwidth requirement may be determined by reading the virtual machine configuration data. The method may also include determining 154 the virtual machine's memory capacity requirement. The virtual machine's memory capacity requirement may be determined by reading the virtual machine configuration data. The method may also include searching 156 a server farm for potential target servers. Searching the server farm may include searching the cross server farm resource availability cache for all servers with available CPUs and available memory that can stay within the CPU and memory headroom policies (FIG. 8) and meet the virtual machine's resource requirements. The resultant list is a list of potential target servers. The method may also include prioritizing 158 the potential target servers. The potential target servers may be prioritized according to the smallest margin that can fully contain the virtual machine's image within a single cc-NUMA node. If the virtual machine's memory requirement cannot be met within the intra-node memory allocation policy (FIG. 8), an alert may be sent to an administrator registering a breach of the placement policy.

Figure 10:
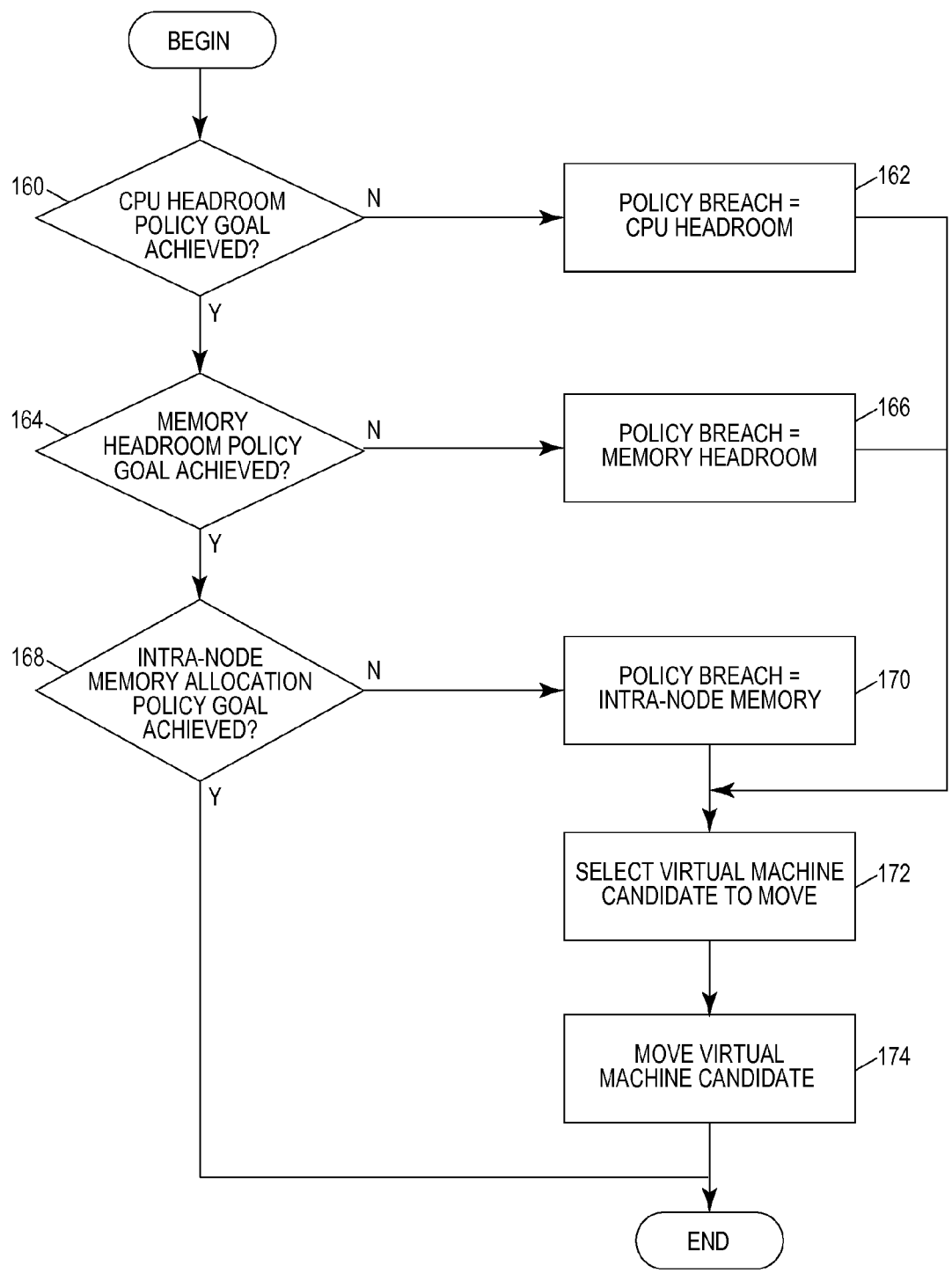
FIG. 10 illustrates a flowchart diagram of a method for virtual machine profiling according to embodiments of the present invention.

FIG. 10 illustrates a flowchart of a method for virtual machine profiling in accordance with embodiments of the present invention. The virtual machine profiling may include run-time optimization profiling or dynamic virtual machine profiling and migration optimization. Referring to FIG. 10, the method may include determining 160 whether a CPU headroom policy goal (FIG. 8) has been achieved. In response to determining that the CPU headroom policy goal is not reached, the method may include setting 162 the type of policy breach equal to "CPU headroom." In response to determining that the CPU headroom policy goal is reached, the method may include determining 164 if a memory headroom policy goal (FIG. 8) has been reached. In response to determining that the memory headroom policy goal is not reached, the method may include setting 166 the type of policy breach equal to "memory headroom." In response to determining that the memory headroom policy goal is reached, the method may include determining 168 if an intra-node memory allocation policy goal (FIG. 8) has been reached. If the intra-node memory allocation policy goal is not reached, the method may include setting 170 the type of policy breach equal to "intra-node memory." In response to determining that the intra-node memory allocation policy goal is reached, the method may end. After the type of policy breach has been set, the method may include selecting 172 a virtual machine candidate to move and then moving 174 the virtual machine candidate.

Figure 11:
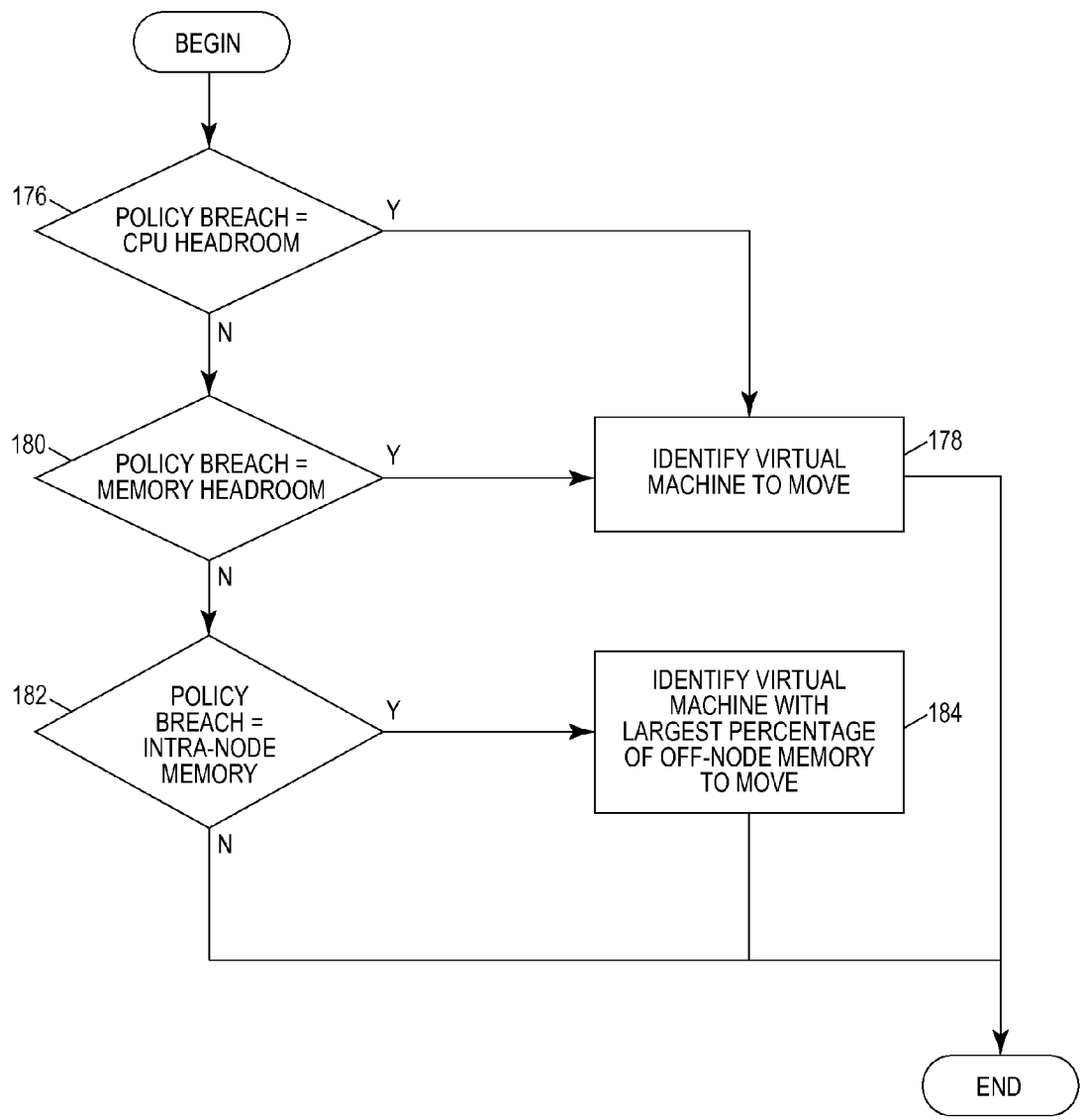
FIG. 11 illustrates a flowchart diagram of a method for virtual machine candidate selection according to embodiments of the present invention.

FIG. 11 illustrates a flowchart of a method for virtual machine candidate selection in accordance with embodiments of the present invention. Referring to FIG. 11, the method includes determining 176 whether the type of policy breach is a CPU headroom policy breach. In response to determining that the type of policy breach is a CPU headroom policy breach, the method may include identifying 178 a virtual machine candidate to move. In response to determining that the type of policy breach is not a CPU headroom policy breach, the method may include determining 180 if the type of policy breach is a memory headroom policy breach. In response to determining that the type of policy breach is a memory headroom policy breach, the method may include identifying 178 a virtual machine candidate to move. In response to determining that the type of policy breach is not a memory headroom policy breach, the method may include determining 182 whether the type of policy breach is an intra-node memory allocation policy breach. In response to determining that the type of policy breach is an intra-node memory allocation policy breach, the method may include identifying 184 a virtual machine candidate with the largest percentage of off-node memory to move. In response to determining that the type of policy breach is not an intra-node memory allocation policy breach, the method may end.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for placement of a virtual machine within a plurality of servers, the method comprising:
   using at least a processor and memory for:
   determining a memory requirement of the virtual machine;
   determining a memory availability of one or more nodes of each of the servers, each node having a processor and memory accessible by the respective processor;
   determining a first node set with available memory and a second node set with available memory that are within different servers and that each meet the memory requirement of the virtual machine;
   determining which of the first and second node sets has the least number of nodes with available memory; and
   placing the virtual machine within the one of the first and second node sets that has the least number of available nodes.

2. The method of claim 1, wherein determining the memory availability comprises determining an amount of memory available within at least one of the one or more nodes of the plurality of servers.

3. The method of claim 1, wherein placing the virtual machine comprises placing the virtual machine within a single physical server among the plurality of servers.

4. The method of claim 1, wherein determining the memory availability comprises determining the memory availability based on a uniform memory access availability.

5. The method of claim 1, wherein the plurality of servers comprises a plurality of non-uniform memory access servers.

6. The method of claim 5, wherein the plurality of non-uniform memory access servers are configured to operate in a server farm.

7. The method of claim 5, wherein the plurality of non-uniform memory access servers are configured to utilize a cache coherent interconnect.

8. The method of claim 1, further comprising using the at least one processor and memory for selecting the virtual machine for migration.

9. The method of claim 8, further comprising using the at least one processor and memory for migrating the virtual machine from a first server of the plurality of servers to a second server of the plurality of servers.

10. The method of claim 8, further comprising using the at least one processor and memory for generating a list of candidate servers of the plurality of servers for placement of the virtual machine.

11. The method of claim 10, wherein placing the virtual machine comprises migrating the virtual machine from a first server of the plurality of servers to a second server among the list of candidate servers based on the determined memory requirement and the determined memory availability.

12. A system for placement of a virtual machine within a plurality of servers, the system comprising:
   a virtual machine placement manager comprising a processor and memory and configured to execute and respond to placement requests; and
   a resource manager comprising a processor and memory and configured to:
   determine a memory requirement of the virtual machine;
   determine a memory availability of one or more nodes of each of the servers, each node having a processor and memory accessible by the respective processor;
   determine a first node set with available memory and a second node set with available memory that are within different servers and that each meet the memory requirement of the virtual machine;
   determine which of the first and second node sets has the least number of nodes with available memory; and
   place the virtual machine within the one of the first and second node sets that has the least number of available nodes.

13. The system of claim 12, wherein the resource manager is configured to place the virtual machine within a single physical server among the plurality of servers.

14. The system of claim 12, wherein the resource manager is configured to determine the memory availability based on a uniform memory access availability.

15. The system of claim 12, wherein the plurality of servers comprises a plurality of non-uniform memory access servers.

16. The system of claim 12, wherein the plurality of non-uniform memory access servers are configured to utilize a cache coherent interconnect.

17. The system of claim 12, wherein the resource manager is configured to: select the virtual machine for migration; and
   migrate the virtual machine from a first server of the plurality of servers to a second server of the plurality of servers.

18. The system of claim 12, wherein the resource manager is configured to:
   select the virtual machine for migration;
   generate a list of candidate servers of the plurality of servers for placement of the virtual machine; and
   migrate the virtual machine from a first server of the plurality of servers to a second server among the list of candidate servers based on the determined memory requirement and the determined memory availability.

19. A computer program product for placement of a virtual machine within a plurality of servers, said computer program product comprising:
   a computer readable non-transitory storage medium having computer readable program code embodied therewith, the computer readable program code comprising:
   computer readable program code configured to:
   determine a memory requirement of the virtual machine;
   determine a memory availability of one or more nodes of each of the servers, each node having a processor and memory accessible by the respective processor;
   determine a first node set with available memory and a second node set with available memory that are within different servers and that each meet the memory requirement of the virtual machine;

determine which of the first and second node sets has the least number of nodes with available memory; and place the virtual machine within the one of the first and second node sets that has the least number of available nodes.

* * * * *